E. N. ELZAY.
PIPE CUTTER.
APPLICATION FILED JUNE 10, 1915.

1,173,496.

Patented Feb. 29, 1916.
2 SHEETS—SHEET 1.

Inventor
E. N. Elzay

Witnesses

By
Attorneys

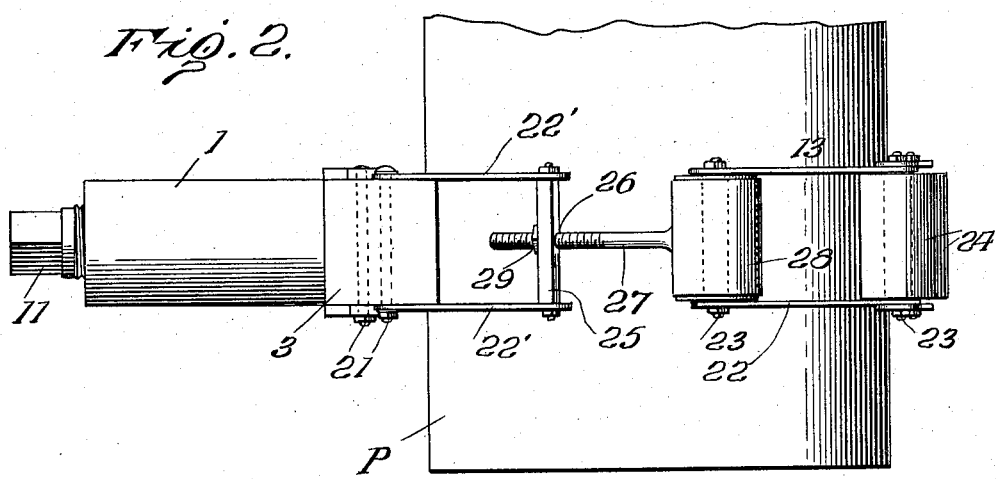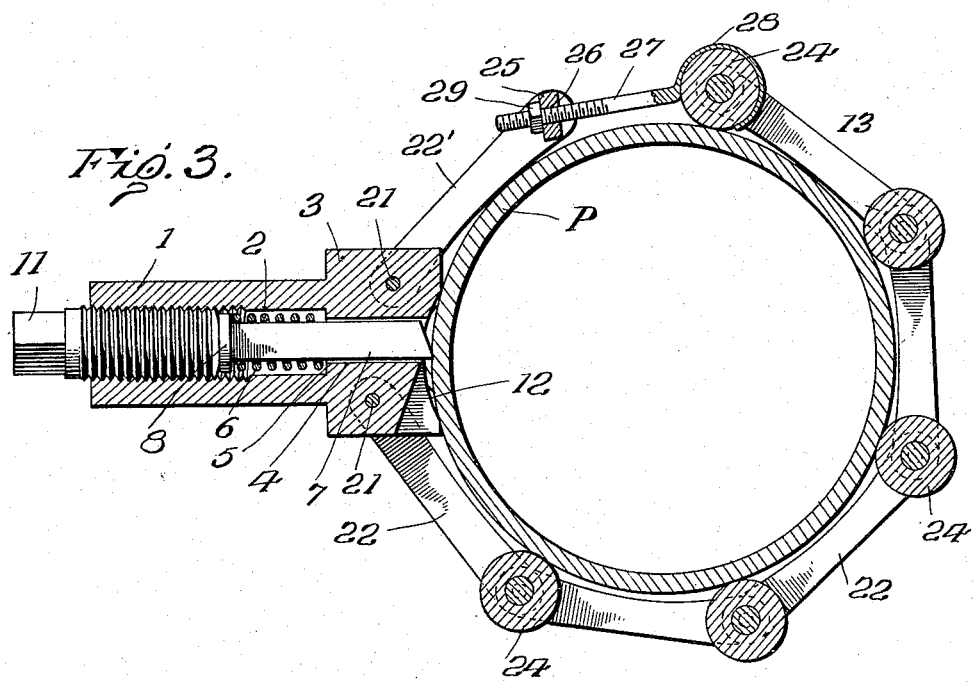

UNITED STATES PATENT OFFICE.

EARL N. ELZAY, OF FINDLAY, OHIO.

PIPE-CUTTER.

1,173,496.

Specification of Letters Patent. Patented Feb. 29, 1916.

Application filed June 10, 1915. Serial No. 33,320.

*To all whom it may concern:*

Be it known that I, EARL N. ELZAY, a citizen of the United States, residing at Findlay, in the county of Hancock and State of Ohio, have invented certain new and useful Improvements in Pipe-Cutters; and I do declare the following to be a full, clear, and exact description of the invention, such as will enable others skilled in the art to which it appertains to make and use the same.

This invention relates to metallic pipe and rod cutting tools, being primarily intended for use as an iron pipe cutter.

The principal object of the invention is to provide a pipe cutter employing a cutting tool similar to that employed in the ordinary turning lathes in order that the pipe may be cut cleanly and without undue compression of the cut edges.

A still further object of the invention is the provision of a cutting tool so constructed that it may be readily clamped to the pipe, rod, or other work operated upon, thereby doing away with the necessity of positively holding the tube in place during use.

Another object of the invention is to provide a cutter of this character which is so constructed that it forms a complete circle about the pipe to be cut with all parts in contact with the pipe and securely clamped thereto in such a manner as to impart a rolling motion when operated.

A still further object of the invention is to provide a cutter of this character which may be securely clamped to the pipe to be cut by means of a chain clamp, or adjuster in which the pipe is held with the same pressure at all points or with the same degree of tension, and when operated the cutter is permitted to roll about the pipe with every part in contact with the surface of the pipe holding the die securely against the surface, and in which the adjuster is so placed as to cause a close adjustment of the cutter and to retain all parts thereof in close contact with the pipe, thus avoiding loss of power in operation.

With these and other objects in view, the invention consists of certain novel features of construction, and the combination and arrangement of parts as will be more fully described and claimed.

Figure 1:
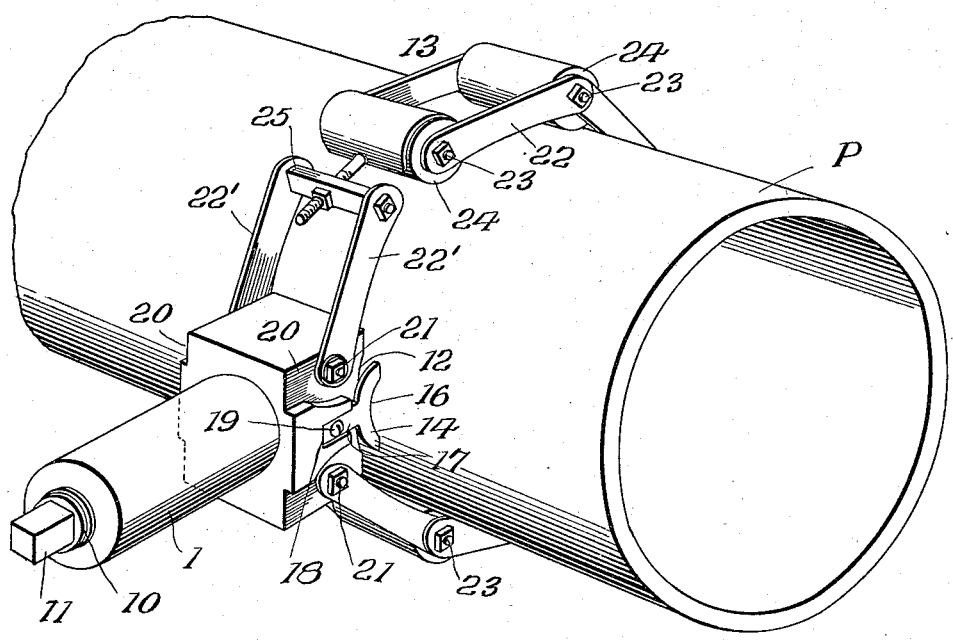
Figure 4:
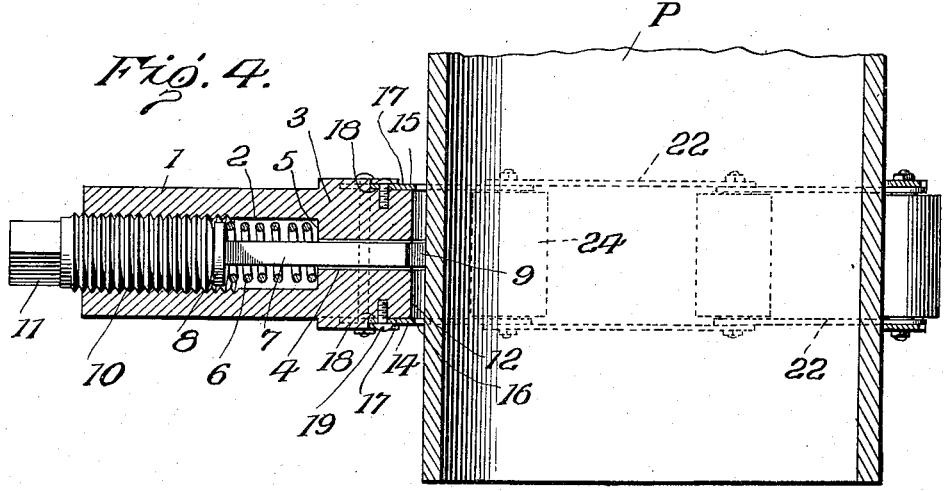

In the accompanying drawings: Figure 1 represents a perspective view of this improved tool in use; Fig. 2 is a side elevation thereof; Fig. 3 is a transverse section of the tool applied; Fig. 4 is a longitudinal sectional view thereof.

In the embodiment illustrated a body portion or stock 1 is shown which is tubular in construction to provide a longitudinal bore 2 and terminating at one end in an enlarged head 3 counter-bored to provide a die receiving socket 4, the bore 2 being provided with a shoulder 5 at its junction with said socket to form an abutment for a coiled spring 6 which encircles the shank of a cutting tool or die 7, said shank being provided at its inner end with a laterally extending shoulder 8 against which the other end of said coiled spring bears, said spring exerting its tension to cushion said knife and to force the cutting end thereof normally inward. The cutting end of this tool or die is here shown beveled with the longer or pointed end 9 thereof sharpened to perform the cutting operation on the pipe in the same manner that a lathe tool does.

The socket 4 in the head 3 is shaped to correspond with the shank of the die 7, both of which are here shown rectangular in cross section to prevent turning of the die in said socket.

The bore 2 is internally threaded to receive an adjusting screw 10 for controlling the tension of the coiled spring 6. This adjusting screw 10 is provided at its outer end with an angular terminal 11 to receive an operating wrench or handle for turning it within the bore. This screw abuts at its inner end against the shouldered outer end of the shank of the die and is designed for forcing said die forwardly when screwed inwardly to cause the cutting end thereof to project a greater or less extent beyond the socket 4 in position for engaging and cutting the pipe to be operated on. This head 3 is provided in its outer end with a concave seat 12 in which the pipe P is designed to rest and to be clamped by a binding or gripping roller bearing chain 13 hereinafter to be described. Mounted on opposite sides of the head 3 are two guides 14 and 15 which are designed as seats to provide for the mounting of pipes of various sizes on the stock. These guides as shown are substantially Y-shaped with the seat between the arms thereof made concave as shown at 16, the shank or stem 17 of said guides being mounted in angular recesses 18 formed in the opposite side faces of the head and shaped to conform to the shape of said elements so that the guides will be reliably held therein against lateral movement, screws 19 being here shown for securing them in operative position and provide for their removal when desired. These side faces of the head 3 are also recessed at opposite ends as shown at 20 to provide seats for receiving the ends of the chain 13, bolts 21 being here shown passed transversely through said head for clamping the chain ends thereto as will be hereinafter more fully described. This gripping chain 13 which coacts with the head for clamping the pipe in operative relation to the cutter consists of a plurality of arcuate side bars or links 22 arranged in spaced pairs with the overlapping ends of adjacent pairs pivotally connected by pintles, pins, or shafts 23. Each of these pintles 23 forms a journal for a roller bearing 24. Any desired number of these links 22 may be employed according to the size of the pipe on which the cutter is designed to be mounted, and the links may be made of any desired length to space the rollers 24 any suitable or desired distance apart. Two of the links 22 at one end of the chain are positioned on opposite sides of the head 3 and engaged with one of the bolts 21 which pass through said head, the width of the head and the rollers 24 being substantially the same so that the links 22 will be positioned the same distance apart at both ends. The links 22' which are connected with the other end of the head 3 by the other bolt 21 are similar in construction to the links 22 except that at the ends opposite those connected with the head instead of having a roller 24 mounted between them, they have a bar 25 of the same length as one of the rollers 24 and provided with an internally threaded aperture 26 to receive a threaded shank 27 carried by a hook-shaped chain adjusting plate 28 which is shown engaged with one of the rollers 24. A nut 29 is engaged with the threaded free end of the shank 27 and by properly positioning it in relation to said shank, the stem is adjusted in the apertured bar 25 to position said bar and the roller carrying the curved plate 28 toward or away from each other for varying the length of the chain to tighten or loosen it on the pipe to be cut, and by means of which the clamping action by said chain on said pipe may be varied.

The adjuster constructed as just described being placed in the chain and not on the frame provides for a close adjustment of the cutter and for the retention of all parts of the cutter in close contact with the pipe, thereby avoiding loss of power in operation.

In the use of this improved cutter or die, the cutting tool 7 having been properly adjusted to position it for engagement with a pipe to be cut, the chain is passed around the pipe and the shank or stem 27 of the adjuster engaged with the threaded aperture in the bar 25 and the nut 29 is tightened thereon to securely clamp the chain around the pipe, forming a complete circle therearound with all parts of the rollers and the cutting edge of the cutter in contact with the pipe. It will thus be clear that the tool may be rotated about the pipe by the application of relatively slight force. To cut the pipe the tool is rotated continuously about it in the same direction, the direction of rotation being dependent upon the position occupied by the cutting die or tool 7. As the tool is rotated the adjuster for the chain may be tightened from time to time to insure the close engagement of the cutter with the pipe and so keep it in proper active engagement therewith to avoid loss of power in operation.

From the above description, it will be obvious that when a tool of this character is used, a pipe either large or small may be cut cleanly without having the edges thereof bent inwardly, and with the application of very little force.

I claim as my invention:

1. In a pipe cutter, the combination of a tubular stock having a head at one end with an angular socket communicating with the bore of said stock, a shoulder formed in said bore at the junction with said socket, a cutting die mounted in said socket and having one end projecting into said bore, said end being provided with a lateral shoulder, a coiled spring mounted on said die between said shoulder and the shoulder in said bore, an adjusting screw having threaded engagement with said bore at the rear of said die for controlling the projection and retraction of said die, and a flexible element connected with the head of said stock adapted to encircle the pipe to be cut, the head of said stock being provided with angular seats, and pipe guides having angular stems mounted in said seats.

2. In a pipe cutter, the combination of a tubular stock having a head at one end with an angular socket communicating with the bore of said stock, a shoulder formed in said bore at the junction with said socket, a cutting die mounted in said socket and having one end projecting into said bore, said end being provided with a lateral shoulder, a coiled spring mounted on said die between said shoulder and the shoulder in said bore, an adjusting screw having threaded engagement with said bore at the rear of said die for controlling the projection and retraction of said die, a flexible element connected with the head of said stock adapted to encircle the pipe to be cut, the head of said stock being provided with seats, and U-shaped pipe guides having angular shanks mounted in said seats and detachably connected with said head.

In testimony whereof I have hereunto set my hand in presence of two subscribing witnesses.

EARL N. ELZAY.

Witnesses:
W. S. SNOOK,
C. C. ELZAY.

Copies of this patent may be obtained for five cents each, by addressing the "Commissioner of Patents, Washington, D. C."